Dec. 4, 1934.　　　A. M. BOEVER　　　1,983,208

COFFEE MAKER

Filed March 17, 1930　　　2 Sheets-Sheet 2

INVENTOR
ANNE M. BOEVER

BY
ATTORNEY

Patented Dec. 4, 1934

1,983,208

UNITED STATES PATENT OFFICE 1,983,208

COFFEE MAKER

Anne M. Boever, Hartford, Conn., assignor to The Silex Company, a corporation of Connecticut Application March 17, 1930, Serial No. 436,499

53 Claims. (Cl. 219—43)

My invention relates to coffee makers.

It has among its objects to provide an improved coffee maker and one especially adapted to use in making coffee by the so called vacuum process, and, to utilize glass bowls. A further object is to provide an improved electric coffee maker stove or heater which is especially adapted to use with a coffee maker of the so called vacuum type including a plurality of superimposed axially connected chambers or bowls wherein the water in the lower bowl is fed up axially over the ground coffee in the upper bowl and retained in the latter during infusion, and then, when the heat has been shut off, returned axially as brewed coffee to the lower bowl, which is then used as a dispensing bowl. A still further object is to provide an improved combination of electric heating means and such a coffee maker, whereby, as compared with previous electrically heated coffee makers of the vacuum type, it is made possible to expedite and simplify the coffee making operation in important respects while also markedly improving the product. Other objects of my invention are to provide improved combinations of an electric heater with an improved co-operating bowl support and such a coffee maker whereby the latter is not only adapted to be quickly heated both directly and by reflection, but also to be quickly cooled in such manner as to expedite and automatically time the return of the brewed coffee to the lower bowl and thereby eliminate the previous need for removing the latter bowl from the heater and providing the separate cooling stand heretofore necessary, while also improving the quality of the coffee. These and other objects and advantages of my improved construction will, however, hereinafter more fully appear.

In the accompanying drawings I have shown, for purposes of illustration, one embodiment which my invention may assume in practice.

In these drawings,—

Figure 1:
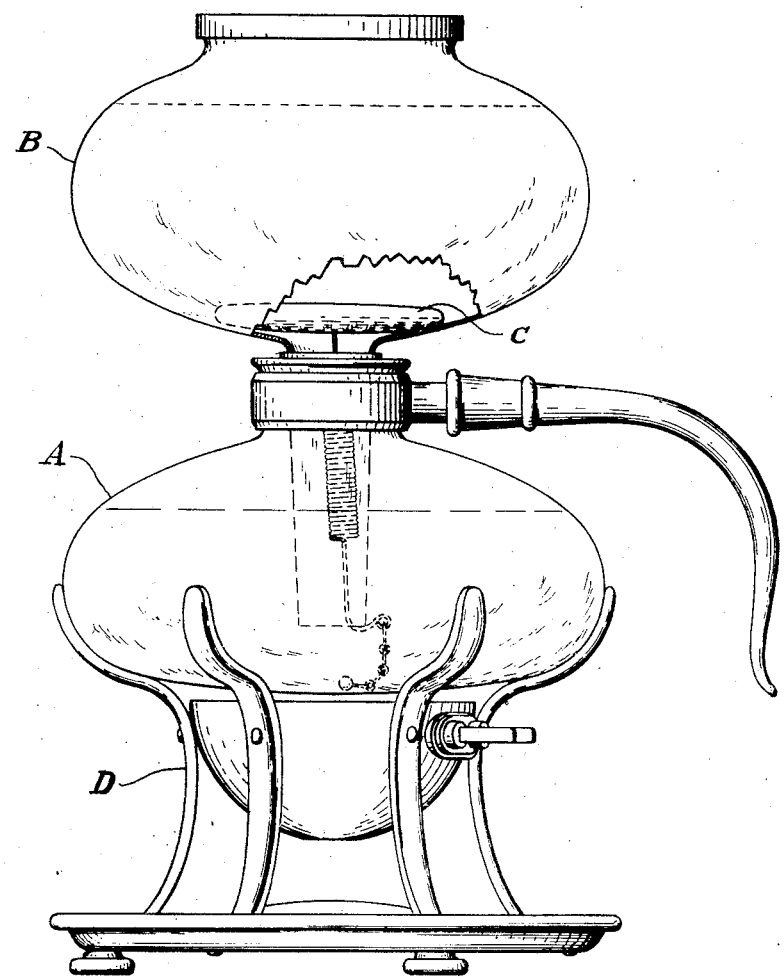
Figure 1 is a side elevation of this form of my improvement, the initial position of the water and the final position of the coffee being indicated in the lower bowl, while the intermediate position of the liquid in the upper bowl is also indicated therein.
Figure 2:
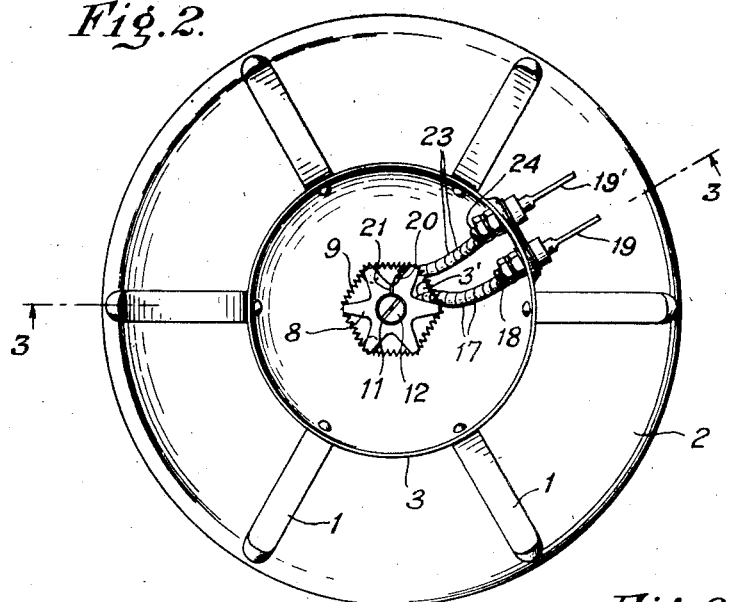
Figure 2 is a plan view of the improved electric heater associated with a support but with the coffee maker removed to facilitate illustration.
Figure 3:
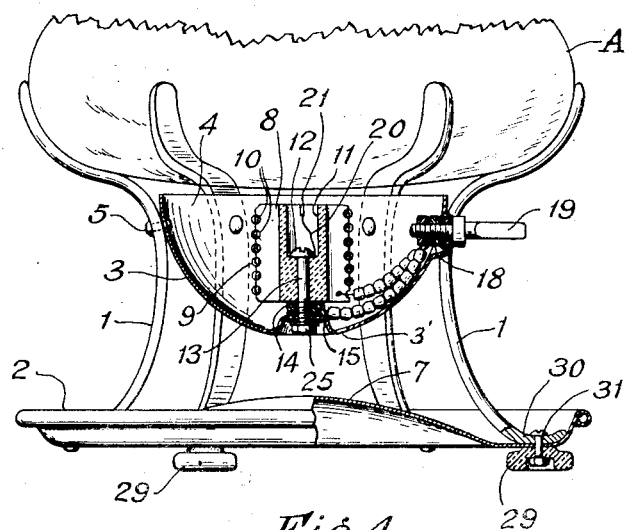
Figure 3 is a vertical sectional view on line 3—3 of Figure 2, a portion of the lower bowl also being shown.
Figure 4:
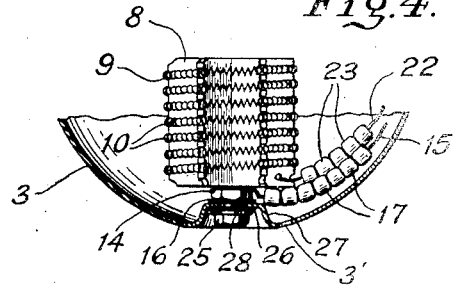
Figure 4 is a detail elevational view of the heating unit.

In this illustrative construction, I have shown in Figure 1 a well known coffee maker of the type referred to, the same comprising a lower bowl A, adapted initially to receive the water to be heated and finally to receive the brewed coffee and act as a dispensing bowl therefor, and also an upper communicating covered bowl B, adapted to co-operate with the lower bowl in the coffee making process and having a tubular bottom extension extending through the neck of the bowl A and sealed in the latter. This bowl B is, as usual, adapted to receive the ground coffee above a suitable filter unit C and to receive the water flowing upward through its extension from the bowl A following heating of the water in that bowl, the brewed coffee later being permitted, upon shutting off the heat and cooling of the lower bowl, to return through this same extension to the lower bowl A to be dispensed. Also, I have shown an improved support, generally indicated at D, which is disposed beneath the lower bowl A and includes improved co-operating supporting and heating means, the latter herein being shown as of the electric type.

Referring more particularly to this support, it will be noted that it comprises radially disposed prongs 1 adapted to support the rounded bottom and sides of the lower bowl A, a supporting tray portion 2 acting as a support for the prongs, and improved heating means being carried on the prongs 1 and spaced from both the bowl A and the tray portion 2. These heating means herein include a cup 3, preferably of metal and having closed side walls and a highly polished interior surface 4, and also having therein a heating element hereinafter described. As shown, this cup 3 is suitably connected near its rim, as by rivets 5, to the prongs 1 and disposed below the bottom of the bowl A carried on the supporting portions of the prongs 1, so that its rim is adjacent to the bottom of the bowl but spaced therefrom in such manner as to avoid contact therewith while producing a maximum flow of heat over the adjacent bottom and sides of the bowl. Herein it will also be noted that the cup 3 is supported solely on the prongs in such manner as to minimize heat conduction to the tray. The bottom of the cup 3 is also provided with a series of suitable air apertures 3', herein three in number and spaced around the axis thereof below the heating element, although obviously the number and arrangement of the apertures may be varied to meet varying conditions and provide the desired free flow of air. Herein the bottom is also substantially spaced above the tray 2. The latter is herein also provided with a shallow raised top 7 adapted to enable an effective air circulation between the cup 3 and the tray and also to permit access to parts carried by the bowl as hereinafter described.

In my improved construction I provide a heating means of an improved construction within the cup 3 and so disposed therein that not only the heat generated by the heating element thereof acts directly upon the bottom of the coffee bowl A, but the heat reflected by the highly polished interior 4 of the cup 3, is utilized. Also, it will be noted that the reflected heat is distributed over the bottom of the bowl. Moreover, through the provision of the open top of the cup 3, its spacing from the bowl, and the openings 3', all of the heat is caused to pass upwardly and then radially outwardly over the bottom and sides of the bowl in a most effective manner, the air to be heated entering from the bottom and being heated as it passes through the heating means.

It will be evident that various means for supplying heat may be used in the cup 3. However, I preferably provide an electric heating means therein of a non-heat-absorbing and quick heating and quick cooling type. This also may assume various forms, but herein I have shown it as comprising an open and light insulating core or base 8 adapted to absorb a minimum of heat, and formed of lava and of the cross section of a star having six points, and carrying on said points a heating element 9 having spaced sections; such a construction being admirably adapted for both quick heating and quick cooling, as hereinafter brought out. Further, it will be noted that the heating element 9 supported upon this star-shaped base 8, is herein in the form of coiled resistance wire and wound spirally in suitable coils one above the other extending from bottom to top of the member 8 and supported with a minimum of engagement with the base 8, in suitable spaced notches 10 or other properly shaped surfaces provided along the edges of the points of this star-shaped member. It will also be observed that the member 8 is provided with an axial recess 11 in its top further reducing its heat absorption, in the bottom of which is disposed a suitable screw 12 which also extends down through a communicating recess 13 of smaller diameter and is suitably supported on and insulated from the bottom of the cup 3. Herein a clamping nut 14 surrounds the screw 12 below the bottom of the member 8, while a conductor lead 15 is disposed beneath this member 14 and above a suitable insulating washer 16. This conductor lead 15 also extends inside the cup 3 through a suitable insulating sheath, such, for example, as one formed by insulating beads 17, to a binding post 18 which is disposed within and near the top of the side walls of the cup 3 and suitably insulated therefrom and also carried on the inner end of an external projecting terminal plug 19 likewise suitably insulated from the cup 3. Attention is, moreover, directed to the fact that an extension 20 is provided on the upper end of the resistance wire 9 and extended through a radial slot 21 in the top of the member 8. This portion 20 is also extended down in the recess 11 and suitably connected beneath the head of the screw 12, while a lead 22, similar to the lead 15 and herein likewise within the cup and insulated by beads 23, is connected between the bottom end of the heating coil 9 and a binding post 24 mounted similarly to and adjacent the binding post 18 and also connected to a plug 19' corresponding to the plug 19 and similarly mounted.

Attention is further directed to the fact that provision is made whereby when desired a new unit 8 equipped with a new resistance coil 9 may be substituted upon releasing the screw 12 from the cup 3 and without removing the plugs 19, 19'. Herein it will be noted that the screw 12 is provided with a removable nut 25 on its bottom end and that a suitable insulating washer 26 is clamped thereby against the bottom surface of an upwardly and inwardly bent portion 27 in the bottom of the cup 3, while this inwardly bent portion is provided with a central aperture 28 of substantially larger diameter than the screw and the aperture in the washer 26 through which the screw extends. Thus, it will be noted that while the nut 26 normally acts to hold the parts together, the conducting parts are insulated from the cup 3 and the unit may be removed whenever desired upon simply removing the screw 12 or nut 26. It will also be noted that in this improved construction these connections are effectually concealed while being readily accessible, the screw head being accessible through the recess 11 and the nut being accessible between the bottom of the cup and the low central portion 7 of the tray.

While in certain constructions the same need not be provided, I have herein also provided the tray with insulating feet 29 and connected the latter to the tray and feet 30 on the bottom of the prongs 1 by suitable means, as, for example, bolts 31, these connecting means 31 thus acting not only to connect the feet 29 to the tray but also as a connecting means for the prongs, tray, and feet 29. In certain constructions wherein these feet 29 are used, it will also be evident that a smaller number of the same may be provided than the number of the prongs 1, and that in such a construction the connecting means 31 engaging the feet 30 can hold all the parts together since the cup 3 is preferably connected to the several prongs.

Attention is also directed to the improved cooling means provided which function to expedite the return of the liquid coffee to the lower bowl after the current is cut off from the heating device. More particularly, it will be observed that the cup 3 is supported in such manner as to expedite radiation, both the exterior and the interior of the same freely communicating with the atmosphere, while the same is true of the rest of the support D. Further, due to the spacing of the top of the cup below the bowl A and the use of the prongs 1, only a minimum of contact is made with the bowl, while a maximum of the bowl is exposed to the atmosphere. Through the new construction and arrangement of the heating unit, radiation is also substantially expedited, there being no large heat absorbing means continuing to radiate heat and the resistance wire being so disposed as to cause air to circulate freely through it. Moreover, the series of holes or perforations 3', which, as previously described, permit the induced flow of heated air up through the coils of the heating unit when the current is on, also act, when the current is off, to permit a free circulation, or induced flow, of cool air tending quickly to lower the temperature of the heating element, the various parts of the support D, and the bowl A, in such manner as to expedite substantially the return of the coffee to the latter bowl.

In operation, it will be evident that when the plugs 19, 19' are connected as usual to an electric circuit, the heating element 9 becomes radiant very quickly and transmits intense heat from its superimposed coils not only directly upward against the bottom of the bowl 6 but also to the polished inner surface 4 of the bowl in such manner as to be reflected thereby over the bottom of the bowl and accordingly further heat the same. Attention is further directed to the fact that due to the structure of the base 8 and the mounting of the heating element 9 on the radially extending arms thereof, only a minimum of heat is absorbed by the base, and that accordingly not only a greater amount of heat is made available for heating the lower bowl, but the same is made available more quickly. Moreover, due to the arangement of the cup 3, the prongs 1, and the apertures 3' in the cup, the heat is most effectively supplied to and concentrated on the bottom portions of the bowl. Due to the quick cooling means provided it will also be especially noted that, when the current supply is interrupted, the base 8, heating element 9 and all the parts heated by the latter, cool very quickly as compared with prior electrically heated devices of this type wherein the electrical heating element has been shrouded in the base and the latter absorbs a large amount of heat and is, further, directly against the bowl.

The quick cooling feature is of decided importance, since, while the bowls remain on the electric heater, it expedites the coffee making operation in a markedly new manner, causing the return of the coffee from the upper to the lower bowl at the end of an infusion or brewing period of proper length and in a fraction of the time previously required when the bowls remained assembled on the heater. It also eliminates all need for removing the coffee maker from the heater, an operation heretofore necessary in previous slow cooling electrically heated coffee makers, in order to make good coffee and prevent the objectionable results incident to overbrewing, by speeding up the return of the coffee in the upper bowl to the lower dispensing bowl. Further, it also eliminates all expense involved in providing and all trouble incident to using, the separate cooling plate or disc heretofore provided with such devices and necessary to support the hot coffee maker when lifted off the heating means, in order to prevent marring of the table or other support. By reason of eliminating need for removal of the coffee maker from the heater, at the same time that convenience is materially increased, and all handling of the bowl prior to pouring is made unnecessary, bowl breakage incident to handling or arising from placing the hot bowl on a much cooler surface, is also reduced.

Attention here is also directed to the fact that my improved quick cooling construction provides a very effective means for automatically timing the coffee brewing operation and thereby improves the product. Heretofore, in order to get the best possible product, the user was supposed to turn off the electric heater when the flow of water from the lower bowl to the upper bowl stopped, and then remove the coffee maker from the heater and set it on a cooling support such as the additional cooling plate mentioned. If the last step was forgotten, however, the coffee infusion operation was prolonged, the coffee not flowing down for fifteen or more minutes, while this too long infusion was highly detrimental to the product. In my improved construction, however, it is not only unnecessary for the operator to perform more than one operation, i. e. to turn off the heat at the proper time, but the length of the remainder of brewing after this one operation is automatically determined and limited to a normal infusion, my improved construction automatically causing the brewing to stop and the brewed coffee to be returned to the lower bowl as soon by sufficiently cooling the latter within the limits of a normal infusion.

More particularly, assuming that my improved coffee maker is of the proper size for the number of cups desired and that the water is of a given temperature at the start, the water from the lower bowl, when heated, will pass up into the upper bowl in a given time. Then, if, as soon as upward flow stops, the heat is turned off and the bowls are left on the heater, cooling of the lower bowl will begin as soon as the heater is turned off and continue for a predetermined time, i. e. until the temperature of the lower bowl has dropped sufficiently to permit the return flow to begin. During this cooling, the coffee will be brewing in the upper bowl at substantially the same temperature existing at the time the heat was turned off. When, however, the temperature of the lower bowl drops below what may be called the critical temperature, which will be reached in a predetermined time within the limits of a normal infusion, the then properly brewed coffee in the upper bowl will immediately begin to flow quickly downward into the lower bowl to complete the coffee making operation.

Thus, obviously, by coordinating my improved cooling means and the heating unit for a coffee maker of any given size, it is possible to predetermine the total length of infusion or brewing time which begins with the first upward flow of water and ends with the last downward flow of coffee and includes a normal infusion at the correct temperature, provided the user only turns off the heat promptly when the upward flow ends. Further, even if this manual operation is slightly delayed, as frequenttly happens and is sometimes preferred, the remaining brewing period is exactly predetermined by my improved quick cooling means at the same time that it is made entirely automatic and also markedly more convenient as brought out above.

It will also be noted that, with the coffee maker still on the stove, I am able properly to lengthen the brewing period, as distinguished from the too quick return obtained where the coffee makers of the prior art were placed on a cold surface or plate, after being manually lifted off the hot stove.

Here it will also be understood that where I refer to obtaining a normal infusion while the coffee maker remains on the stove, I intend to distinguish from the previous far longer and abnormal infusions necessarily obtainable heretofore under the same conditions, and inherent in the electrically heated vacuum type coffee makers of the prior art, wherein the stove formed a heat storage reservoir of large capacity which accordingly maintained the brewed coffee in the upper bowl for fifteen or more minutes, and required that the coffee maker be removed manually from the stove in order to permit termination of infusion in any shorter period. Further, it will be understood that while, with the coffee maker still on the stove, I am able to obtain an infusion period of any length recognized as normal in this art, i. e. infusions of a length between three and seven minutes at a correct brewing temperature, I do not wish to be limited to an infusion period of any particular length, it being apparent that the length of the same will be varied to suit different tastes and under different conditions and that the same may be varied by varying the number and size of the air flow apertures and the relation of the same and the heating unit to one another and the size of the lower bowl of the coffee maker, while still avoiding the abnormally long infusions heretofore unavoidable in the prior art save by manually removing the coffee maker from the stove in the manner previously necessary.

It will further be noted that in this construction not only is the heat generated by the heating unit effectively utilized and the device also quickly cooled, but that an exceedingly attractive structure is produced. Moreover, when, after the bowl B has been removed and the dispensing bowl A is left on the support during the meal, it is desired to keep it hot on the table, the user is enabled to see the new and attractive illumination of the coffee by the heating element. Further, it will be noted that the construction provided is one adapted to be economically manufactured, and that the construction is also well adapted to withstand the usage to which such devices are ordinarily subjected. These and other advantages will, however, be clearly apparent to those skilled in the art.

While I have in this application specifically described one embodiment which my invention may assume in practice, it will be evident that the same may be modified to assume various other forms without departing from its spirit, and it will be understood that it is my intention to include all such modifications within the scope of the appended claims.

What I claim as new and desire to secure by Letters Patent is:—

1. An automatic infusing stove for vacuum type coffee makers including a quick cooling structure having coffee maker bowl supporting means and an air space below a bowl thereon and communicating laterally with the atmosphere from beneath said bowl, electric resistance means delivering into said air space and out of contact with a bowl on said supporting means, and infusion controlling passage forming means for automatically effecting a normal infusion following cessation of current flow and while a bowl is on said supporting means.

2. In a heater, an article support, a heater housing having an open top spaced below an article on said support and communicating through the atmosphere below said support with an article thereon, electric heating means in said housing, and air flow passage means through said housing having flow therethrough induced by said heating means and delivered by the latter through said top upon the article bottom and then laterally through said space to the atmosphere from below an article on said support.

3. In a heater, an article support permitting a flow of atmospheric air upward upon the article bottom and having a heater housing having an open top below said support and communicating with the atmosphere below an article thereon, electric heating means in said housing, and air flow passage means through said heating means having flow therethrough induced by the latter and delivered thereby through said top upon the article bottom and then laterally to the atmosphere from beneath an article on said support.

4. In a heater, an article support permitting a flow of atmospheric air upward upon the article bottom and having a heater housing below said support having an open top and communicating laterally with the atmosphere below an article on said support, electric heating means in said housing, and air flow passage means through both said housing and heating means having flow therethrough induced by said heating means and delivered by the latter through said top upon the article bottom and then laterally to the atmosphere from below an article on said support.

5. In a heater, upwardly projecting bowl supporting means forming a peripheral bowl seat, a cupped container below said seat and having an open top communicating with the atmosphere below a bowl on said seat, electric heating means in said container, and air flow passage means through said container having flow therethrough induced by said heating means and delivered thereby through said top upon the bowl bottom and laterally from below said seat between said supports.

6. In a heater, upwardly projecting spaced bowl supports co-operating to form a peripheral bowl seat exposing the bowl bottom, a cupped container disposed below said seat out of contact with a bowl thereon and having an open top communicating with the atmosphere below said seat and between said supports, electric heating means in said container, and air flow passage means through said housing and heating means having flow therethrough induced by said heating means and delivered thereby through said top upon the bowl bottom and laterally from below said heat between said supports.

7. In a heater for glass bowls, bowl supporting and heater housing means having a bowl seat and having means providing free lateral communication with the atmosphere beneath said seat, electric heating means in said housing means spaced below said seat and having an exposed heating element adjacent said seat communicating freely vertically through the atmosphere with a bowl on said seat and laterally with the atmosphere through said second mentioned means, and air ingress means below said electric heating means and communicating with the atmosphere through said housing means and said second mentioned means.

8. In a heater for glass bowls, quick cooling bowl supporting means, heater housing means having air ingress and egress means beneath the bottom of a bowl thereon co-operating in directing upward on the bowl the heat generated by heating means therein, heating means in said housing means, and air passage means through said heating means communicating with said air ingress and egress means.

9. In a heater for glass bowls, quick cooling bowl supporting means upon which a bowl is seated having air egress means beneath the bottom of a bowl thereon, electric heating means for the bowl bottom having a heating element out of contact with the bowl, air ingress means beneath said electric heating element, and air passage means through said heating element connecting said air ingress and egress means.

10. In a heater for glass bowls, quick cooling bowl supporting means upon which the bowl is seated having air ingress means in its bottom and air egress means in its top beneath the bottom of a bowl thereon, an electric heating element, a quick cooling support for the latter disposed above said air ingress means, and air passage means through said support connecting said air ingress and egress means.

11. In a heater for glass bowls, quick cooling bowl supporting means having air egress means below the bottom of a bowl thereon and also having spaced below the bowl bottom heater housing means, heating means in said housing means, air passage means through said heating means communicating with said air egress means, and axial air ingress means in said housing means below said heating means communicating with said air passage means.

12. In a heater for glass bowls, quick cooling bowl supporting means having air egress means below the bottom of a bowl thereon, heater housing means having air ingress means in its bottom, heating means in said housing means above said air ingress means, both said housing and heating means being disposed out of direct heat conducting relation with a bowl supported by said supporting means, and air passage means through said heating means connecting said air ingress and egress means.

13. In a heater for glass bowls, bowl supporting means exposing the bowl bottom to the atmosphere and having spaced below the bowl bottom an open topped cup provided with a reflecting inner surface and air outlet means spaced below said supporting means and air inlet means below said outlet means, heating means supported in said cup and having a radiant heating element, and air passage means extending through said heating element and connecting said air inlet and outlet means.

14. In a heater for glass bowls, bowl supporting means exposing the bowl bottom to the atmosphere, an open topped housing spaced below the bottom of a bowl thereon and provided with a reflecting inner surface and air ingress means, heating means supported in said housing and carrying a heating element, and air passage means through said heating means communicating with said air ingress means.

15. In a heater for glass bowls, bowl supporting means providing radial supporting portions having a bowl seat therein, an open topped axial reflecting member spaced below a bowl on said seat, heating means in said member, and air passage means extending through said reflecting member and heating means and delivering on a bowl on said seat heating and cooling air flows induced by said heating means.

16. In a heater for glass bowls, bowl supporting means providing radial prongs having a bowl seat therein, an open topped axial reflecting member spaced below said seat having top and bottom air apertures below said seat, heating means in said member, and air passage means through said heating means connecting said top and bottom air apertures.

17. In a heater, article supporting means having a bowl seat therein, an open topped reflecting member spaced below said seat having lateral air egress means between said member and said supporting means and air ingress means below said air egress means, an electric heating unit in said reflecting member supplying heat and light to an article on said supporting means, and air passage means through said unit connecting said air ingress and air egress means.

18. In combination, article supporting means providing an article seat, an open topped housing member of substantially smaller maximum diameter than said seat opening upwardly immediately below an article on said seat and having air egress means between said member and said article and communicating air ingress means, electric heating means disposed within said housing member, and air passage means through said heating means connecting said ingress and egress means.

19. In combination, article supporting means providing a bowl seat, open topped heater housing means of maximum diameter at its top and of substantially smaller maximum diameter than said seat having air ingress and egress means below an article on said support and delivering air upon the axial portion of the bottom of a bowl on said seat, electric heating means in said housing means above said air ingress means and terminating below the top of said housing means, and air passage means through said heating means connecting said air ingress and egress means.

20. In combination, an article support, an open topped cupped member opening upwardly below an article on said support, an electric heating unit disposed within said cupped member, an axial connection connecting said unit to said cupped member, and terminals projecting through the side of said cupped member and having disposed within the latter independent connections to said unit.

21. In combination, an article support, an open topped cupped member opening upwardly below an article on said support, an electric heating unit disposed within said cupped member, an axial connection connecting said unit to said member, and terminals carried on the side of said cupped member and having flexible insulated connections inside the latter leading to said unit.

22. In combination, an article support comprising upstanding prongs having article engaging means on their upper ends, a tray carrying said support and spaced below the article engaging means of said support, an open topped cupped member carried wholly by said prongs and spaced below said article engaging means and above said tray, and a heating unit carried in said cupped member and acting on an article on said support.

23. In combination, the support for glass bowls having radial bowl engaging portions, an open topped reflecting bowl supported thereby and within said portions, a radiant heating element supported in said last mentioned bowl and supplying heat and light to a bowl carried on said radial bowl engaging portions, and communicating air passage means through said reflecting bowl and heating element delivering on a bowl on said radial portions and through which air flow is induced during the heating and cooling of said heating element.

24. In combination, a support for glass bowls having radial bowl engaging portions, an open topped reflecting bowl-like member axially within said portions extending into adjacency to but spaced below a bowl thereon, and radiant heating means supported in said last mentioned bowl-like member and supplying heat and light to a bowl carried on said radial bowl engaging portions, said heating means comprising a substantially non-heat-absorbing support supported in said reflecting bowl-like member and carrying a resistance element.

25. In combination, a support for glass bowls having radial bowl engaging portions, an open topped reflecting bowl-like member within said portions extending into adjacency to but spaced below a bowl thereon, and radiant heating means supported in said last mentioned bowl-like member and supplying heat and light to a bowl carried on said radial bowl engaging portions, said heating means comprising a substantially non-heat-absorbing support supported in said reflecting bowl-like member and carrying a resistance element having spaced sections, and said reflecting bowl-like member having air egress means above said heating means and air ingress means below the same.

26. In combination, a heat reflecting cup having an open top forming an outlet for heated air and also having air inlet means leading upward through its bottom, substantially non-heat-absorbing resistance supporting means therein above said inlet means providing a plurality of spaced resistance supports, and electric resistance means carried within said cup engaging said spaced supports and so disposed as to permit a free circulation of air through the same.

27. In combination, a heat reflecting cup having an open top forming an outlet for heated air and also having air inlet means in its bottom, substantially non-heat-absorbing resistance supporting means therein above said inlet means providing a plurality of spaced resistance supports, electric resistance means carried within said cup engaging said supports and so disposed as to permit a free circulation of air through the same, and terminal plugs carried at one side of said cup electrically connected to said resistance means within said housing member and insulated from the latter.

28. In combination, a plurality of prong members providing radial bowl supports at their upper ends, an open topped heater housing member carried by said prong members and within the same below said bowl supports, electric heating means supported in said housing member, a tray spaced below said housing member and on which the lower ends of said prong members are supported, supporting feet below said tray member, and means for connecting the lower ends of certain of said prong members to said tray and to said supporting feet.

29. A coffee maker heater having a bowl support, an open topped heater housing member carrying electrical heating means therein and communicating vertically and laterally with the atmosphere below a bowl on said support and delivering heated air over the bottom of such a bowl, and means forming air passage means through the housing member beneath said heating means.

30. A coffee maker heater having radial bowl supports, a cupped member having an open top communicating with the atmosphere and out of contact with a bowl on said supports, electrical heating means in said cupped member having a heating element provided with spaced sections, and means forming air passage means through said cupped member below said element.

31. In combination, a vacuum type coffee maker having interconnected upper and lower bowls, a quick cooling electric heating means adjacent the lower bowl, and means for effecting a substantial induced cooling flow upon said lower bowl upon cessation of current flow while said bowl remains in the same relation to said heating means.

32. In combination, a vacuum type coffee maker having interconnected upper and lower bowls, a quick heating and cooling electric heating means adjacent the lower bowl and disposed out of contact with the latter, and means for effecting substantial heating and substantial cooling flows upon said lower bowl following the initiation and cessation, respectively, of current flow.

33. In combination, a vacuum type coffee maker having interconnected upper and lower bowls, supporting means for the lower bowl exposing the bottom thereof to the atmosphere, quick cooling electric heating means adjacent the bottom of said lower bowl and out of contact therewith, and means for effecting a substantial induced cooling flow upon the bottom of said lower bowl upon cessation of current flow.

34. The combination with a vacuum type coffee maker having interconnected upper and lower bowls, of combined supporting and electric heating devices for the lower bowl, and means co-operating with said devices upon cessation of current flow for effecting prompt cooling of said bowl while still in the same relation to said devices as during the heating of said bowl.

35. The combination with a vacuum type coffee maker having interconnected upper and lower bowls, of supporting and electric heating means for said lower bowl, and means effective upon cessation of current flow for effecting prompt return of the liquid coffee in the upper bowl to said lower bowl while the latter remains on said supporting and heating means.

36. The combination with a vacuum type coffee maker having interconnected upper and lower bowls, of supporting and electric heating means for said lower bowl, and means acting upon cessation of current flow and while said lower bowl is on said first mentioned means for producing prompt cooling of said lower bowl and a prompt return to the latter of the liquid coffee in said upper bowl.

37. The combination with a vacuum type coffee maker having interconnected upper and lower bowls, of supporting and electric heating means for said lower bowl, and means outside said bowls and automatically effective upon cessation of current flow for expediting the return of the liquid coffee in the upper bowl to said lower bowl, delivering a cooling flow upon the previously heated area of said lower bowl while the latter remains on said supporting and heating means.

38. The combination with a vacuum type coffee maker having interconnected upper and lower bowls, of supporting and electric heating means for said lower bowl, and means co-operating with said first mentioned means upon cessation of current flow to provide a flow of cooling air upon said lower bowl and said first mentioned means effecting a prompt return of the liquid coffee in said upper bowl while said lower bowl remains on said first mentioned means.

39. In combination, a vacuum type coffee maker having interconnected upper and lower bowls, electrical heating means acting on the lower bowl, and means for expediting flow of liquid to and from said upper bowl providing while said heating means and lower bowl are in the same relationship a circulation of heated air toward the bowl during current flow and a circulation of cooling air upon said lower bowl when current flow is interrupted.

40. In combination, a vacuum type coffee maker having interconnected upper and lower bowls, supporting means for the latter, a heater housing member below and out of contact with said bowl, quick heating and cooling electric heating means in said member, and means for expediting flow of liquid to and from said upper bowl providing an upward air circulation through said heating means and member on said lower bowl upon initiation and cessation of current flow.

41. The combination with a vacuum type coffee maker having interconnected upper and lower bowls, of combined supporting and electric heating devices for the lower bowl co-operating upon cessation of current flow to provide means for expediting the cooling of said bowl while still in the same relation thereto, comprising a quick cooling support for said bowl, quick cooling electrical heating means below and out of heat conducting relation with said bowl, and air passage forming means providing during heating a heating flow through said heating means and against the bottom of the bowl and during cooling an induced cooling flow through said heating means and against the bottom of the bowl.

42. The combination with a vacuum type coffee maker having operatively interconnected water and coffee bowls, of electric heating means for said water bowl operative to infuse coffee in the coffee bowl with the water in the water bowl, and means acting upon cessation of current flow and while said water bowl remains in operative relation to said electric heating means for automatically returning the brewed coffee in said coffee bowl to said water bowl upon the completion of a normal infusion.

43. The combination with a vacuum type coffee maker having operatively interconnected water and coffee bowls, of electric heating means for said water bowl operative to infuse coffee in the coffee bowl with the water in the water bowl, means for supporting said water bowl in operative relation to said heating means, and means acting upon cessation of current flow and while said water bowl remains on said supporting means in operative relation to said electric heating means for automatically returning the brewed coffee in said coffee bowl to said water bowl upon the completion of a normal infusion.

44. The combination with a vacuum type coffee maker having operatively interconnected water and coffee bowls, of electric heating means for said water bowl operative to infuse coffee in the coffee bowl with the water in the water bowl including a resistance and a resistance support both spaced out of contact with said water bowl below the latter, means for supporting said water bowl in operative relation to said heating means, and means acting upon cessation of current flow and while said water bowl remains on said supporting means in operative relation to said electric heating means for automatically returning the brewed coffee in said coffee bowl to said water bowl upon the completion of a normal infusion.

45. The combination with a vacuum type coffee maker having operatively interconnected water and coffee bowls, of electric heating means for said water bowl for effecting transfer of liquid therein for infusion in said coffee bowl, and infusion controlling means automatically operative upon said water bowl upon cessation of current flow to said heating means for automatically effecting sufficient cooling of said water bowl to terminate infusion in said coffee bowl within the limits of a normal infusion.

46. The combination with a vacuum type coffee maker having operatively interconnected water and coffee bowls, of electric heating means for said water bowl for effecting transfer of liquid therein for infusion in said coffee bowl, and infusion controlling means automatically operative upon said water bowl upon cessation of current flow to said heating means for automatically effecting sufficient cooling of said water bowl to terminate infusion in said coffee bowl within the limits of a normal infusion, said infusion controlling means including quick cooling structure supporting said bowl and means for obtaining a cooling air flow motivated by said heating means and leaving the heated portion of said water bowl upon cessation of current flow.

47. The combination with a vacuum type coffee maker having operatively interconnected water and coffee bowls, of electric heating means for said water bowl operative to infuse coffee in the coffee bowl with the water in the water bowl, and means, comprising cooperating supporting and air flow directing elements having air flow passages delivering on said water bowl an air flow motivated by said heating means upon cessation of current flow and while said water bowl remains in operative relation to said heating means, for automatically returning the brewed coffee in said coffee bowl to said water bowl upon the completion of a normal infusion.

48. The combination with a vacuum type coffee maker having operatively interconnected lower water and upper coffee bowls, of electric heating means for said lower bowl operative to infuse coffee in said upper bowl with the water in said lower bowl, and means, comprising co-operating lower bowl and heater supporting elements having air flow directing passages delivering on said lower bowl an air flow motivated by said heating means during cooling of the latter and while said lower bowl remains in the same relation to said heating means, for automatically returning the brewed coffee in said upper bowl to said lower bowl upon the completion of a normal infusion.

49. In an electric stove, a heater housing bowl having bowl seat forming means on its rim and lateral air passage means below said seat and closely adjacent said bowl communicating freely with the atmosphere, a heating unit disposed in said bowl substantially at the bottom of said lateral air passage means, and means for enabling a flow of cooling air through said heating unit upon an article on said seat and laterally through said lateral air passage means.

50. A coffee maker stove having a bowl support on its top and a heater housing surrounding the axis of said support, a refractory electric heating unit in said housing spaced out of contact with a bowl on said support and above the bottom of said housing, and air passage means in the bottom of said housing and communicating with the space above said heating unit and laterally with the atmosphere below said support while a bowl is thereon.

51. A coffee maker stove having a bowl support on its top and a heater housing surrounding the axis of said support below said support, a quick cooling electric heating means in said housing spaced out of contact with a bowl on said support, and air flow inducing passage means in the bottom of said housing and in the top thereof communicating with the space above said heating means and laterally with the atmosphere below said support while a bowl is thereon.

52. A coffee maker stove having a bowl support on its top, a heater housing surrounding the axis of said support below the latter, a quick cooling refractory electric heating unit in said housing spaced below said support in adjacency to and out of contact with a bowl thereon, and cooperating means for effecting quick cooling of said unit upon cessation of current flow therethrough and while a bowl is on said support.

53. A coffee maker stove having a bowl support on its top, a heater housing surrounding the axis of said support below the latter, a quick cooling refractory electric heating unit in said housing spaced below said support in adjacency to and out of contact with a bowl thereon, and cooperating means for effecting quick cooling of said unit upon cessation of current flow therethrough and while a bowl is on said support comprising air passages leading through said refractory unit and communicating with the atmosphere below the same and freely laterally with the atmosphere beneath a bowl on said support.

ANNE M. BOEVER.

CERTIFICATE OF CORRECTION.

Patent No. 1,983,208.                          December 4, 1934.

ANNE M. BOEVER.

It is hereby certified that error appears in the printed specification of the above numbered patent requiring correction as follows: Page 4, lines 100 and 101, claim 5, strike out the words "below said seat between said supports" and insert instead the latter to the atmosphere; and line 114, claim 6, for "heat" read seat; page 5, line 125, claim 23, for "the" read a; page 6, line 1, claim 25, after "member" insert the word axially; and page 7, line 85, claim 46, for "leaving" read laving; and that the said Letters Patent should be read with these corrections therein that the same may conform to the record of the case in the Patent Office.

Signed and sealed this 22nd day of January, A. D. 1935.

(Seal)                                                                          Leslie Frazer
Acting Commissioner of Patents.